US009692694B2

(12) United States Patent
Wang et al.

(10) Patent No.: US 9,692,694 B2

(45) Date of Patent: Jun. 27, 2017

(54) MULTI-PROTOCOL ROUTING SYSTEM AND METHOD DRIVEN BY APPLICATION AND NETWORK IN CONVERGENCE

(71) Applicants: Institute of Accoustics, Chinese Academy of Sciences, Beijing (CN); Beijing Intellix Technology Company Limited, Beijing (CN)

(72) Inventors: Jinlin Wang, Beijing (CN); Jiali You, Beijing (CN); Lingfang Wang, Beijing (CN)

(73) Assignee: Institute of Acoustics, Chinese Academy of Sciences (CN)

( * ) Notice: Subject to any disclaimer, the term of this patent is extended or adjusted under 35 U.S.C. 154(b) by 205 days.

(21) Appl. No.: 14/397,661

(22) PCT Filed: Jan. 7, 2013

(86) PCT No.: PCT/CN2013/070175

§ 371 (c)(1), (2) Date: Oct. 29, 2014

(87) PCT Pub. No.: WO2014/101316

PCT Pub. Date: Jul. 3, 2014

(65) Prior Publication Data

US 2015/0074287 A1 Mar. 12, 2015

(30) Foreign Application Priority Data

Dec. 27, 2012 (CN) .......................... 2012 1 0581549

(51) Int. Cl.

| | |
|---|---|
| ***H04L 12/781*** | (2013.01) |
| ***H04L 12/64*** | (2006.01) |
| ***H04L 12/721*** | (2013.01) |

(52) U.S. Cl.

CPC .......... *H04L 45/52* (2013.01); *H04L 12/6418* (2013.01); *H04L 45/14* (2013.01)

(58) Field of Classification Search

CPC ...... H04L 12/6418; H04L 45/14; H04L 45/52

See application file for complete search history.

(56) References Cited

U.S. PATENT DOCUMENTS

| | | | | |
|---|---|---|---|---|
| 8,077,726 | B1 | 12/2011 | Kumar et al. | |
| 2003/0110289 | A1 * | 6/2003 | Kamboh ................ | H04L 45/00 709/242 |

(Continued)

FOREIGN PATENT DOCUMENTS

| | | |
|---|---|---|
| CN | 1466340 | 1/2004 |
| CN | 101272317 | 9/2008 |
| CN | 102624621 | 8/2012 |

*Primary Examiner* — Brian J Gillis

*Assistant Examiner* — Gil H. Lee

(74) *Attorney, Agent, or Firm* — Jack Schwartz & Associates, PLLC

(57) ABSTRACT

The present invention relates to a multi-protocol routing system, comprising a route determining module and a forwarding module which are located in network layer, wherein the route determining module is used for determining, based on the related information of applications and networks, the types of routable protocols and the next-hop path which are to be selected in the current routing phase; the forwarding module, including different routable protocols and corresponding routing information, is used for periodically calculating the newest remaining network resources and the state of link during a routing process and updating the forwarding table in current state. By integrating various characteristics and states of applications as well as different routable protocols, the present invention realizes real-time protocol selection and dynamic routing. Moreover, the pres- (Continued)

A first router obtains routing information related to applicatio ns by virtue of interaction with a certain host computer or a certain router after receiving a network layer message sent by the host computer or the router A routing decision module selects the optimal routable protocol and path capable of meeting the characteristic performance targets of the applications as far as possible for the current application, and estimates the new resource occupancy condition of the candidate paths selected under the current network environment according to the decision result The first router selects the corresponding routable protocol and next-hop path according to the decision information of the routing decision module and performs forwarding, and the routing forwarding module updates a corresponding resource state in the current routing table and rule according to the resource occupancy condition of the forwarding process A second router performs unpackaging on the message, and performs information extraction and processing on the interaction data by the routing decision module in the second router, and the operations include extracting characteristic performance targets, and updating performance needs after the last-hop forwarding Whether the characteristic performance targets are realized No Yes The routing process is finished ent invention is easy to be expanded to other protocols, thus being adaptive to the continuous development and evolution of network services.

4 Claims, 2 Drawing Sheets

(56) References Cited

U.S. PATENT DOCUMENTS

| | | | | |
|---|---|---|---|---|
| 2006/0193295 | A1 * | 8/2006 | White | H04L 12/5692 370/336 |
| 2013/0128888 | A1 * | 5/2013 | Zhang | H04L 45/04 370/390 |

* cited by examiner

MULTI-PROTOCOL ROUTING SYSTEM AND METHOD DRIVEN BY APPLICATION AND NETWORK IN CONVERGENCE

FIELD OF THE INVENTION

The present invention relates to the field of computer network technology, and in particular to a multi-protocol routing system and method driven by the integration of applications and networks.

BACKGROUND OF THE INVENTION

The current Internet networks take an IP (Internet Protocol) technology as a core, lots of network services are realized by a transport layer and the layers above the transport layer. The network layer and the data-link layer are simple in protocols and concise in calculation, thus ensuring the expansibility of the network. However, with the rapid development of Internet services and the integration of three networks (computer network, conventional telecommunication network and broadcasting television network), new technologies and services, for example, video services, constantly emerge. Meanwhile, with the continuous development of the Internet of Things (JOT) technology, terminals with a certain computational processing capacity form a "sea" by virtue of the characteristics of large scale, wide distribution, high real-time performance and the like, which brings new challenges to both the bearing capacity and processing capacity of the traditional networks. Meanwhile, with the aggregation of big data and the continuous increasing of transmission requirements, cloud computing has already become into one of the main service modes, which leads to a higher demand for hardware infrastructure of the Internet, as well as network protocols and control systems during operation.

There exist difficulties for current network systems to be adaptive to services and application requirements in the following aspects: the limited IP resources cannot meet the requirements of the continuous increase of service resources; it is difficult for the current network architectures and protocols to bear the transmission task focusing on large-scale data transmission; network safety problem arises due to the diversity of data; it is difficult for the existing network to meet the performance requirements in terms of service quality with the increase of needs on storage and computing resources during transmission process, and the like. Because presently a lot of optimization work is performed on application layer, network system structures taking IP as a core cannot meet the needs of the modern network services neither in traffic scale nor in function interfaces, even if the network performances is improved to some extent; meanwhile, under the situation that "sea cloud" computing is constantly developing, due to the routing mode of binding identifications and positions, transmission and processing efficiencies are seriously restricted, so inherent problems cannot be solved. Regard these problems, lots of explorations have been carried out, and application-oriented routable protocols have been put forward, most of these routable protocols being orientated to a certain specific application, so it is quite difficult to realize the coordination among these lots of routing protocols with various forms, i.e., the generalization of these protocols is too bad.

SUMMARY OF THE INVENTION

The object of the present invention is to overcome the defect that the traditional IP routing technology cannot meet the requirements in terms of diffusion efficiency and speed of those real-time services, thus providing a routing method suitable for a multi-protocol environment.

In order to realize the purpose aforementioned, the present invention provides a multi-protocol routing system, which comprises a route determining module and a forwarding module which are located in the network layer, and wherein:

the route determining module is used for determining, based on the relevant information of applications and networks, the type of the routable protocol and the next-hop path which are to be selected in current routing phase; and the forwarding module, including different routable protocols and corresponding routing information, is used for periodically calculating the newest remaining network resources and the state of link during a routing process and updating the forwarding table in current state.

In the technical solution aforementioned, the information related to the applications includes the information about the features and the state of the applications, and specifically includes one of the content information, the requirements information, the related QoS (Quality of Service) information of other applications, operation state and other related state information, or the combination of two or more of the aforementioned information; the information related to the networks includes the information about the features and state of the networks, and specifically includes one of position information, link state information, the information of related networks, or the combination of two or more of the aforementioned information.

In the above technical solution, the route determining module specifically includes the following functions:

requesting the routing-related information of all the routable protocols maintained currently from the forwarding module, so as to obtain all the currently possible candidate paths as well as the network states information and resource occupying information corresponding to the candidate paths;

extracting, according to data messages or interaction data, the characteristic information of the applications and the characteristic performance target information of the applications;

determining a route; and estimating, according to the above determining result, the new resource occupying condition of the related candidate routing paths after message is forwarded under the current network environment.

In the above technical solution, the routing determining is realized by means of calculating a decision function.

The present invention further provides a multi-protocol routing method realized on the above multi-protocol routing system, which comprises the steps of:

Step 1) a first router obtains the routing information related to applications through interaction with a host computer or another router after receiving a network layer message from the host computer or the later router;

step 2) the route determining module in the first router selects the optimal routable protocol and path capable of meeting the characteristic performance targets of the current application according to the information obtained in step 1), the candidate paths obtained from the forwarding module, the network states and resource occupying condition information corresponding to the candidate paths; and the route determining module further estimates the new resource occupying condition of the candidate paths selected under the current network environment according to the decision result;

step 3) the first router selects the corresponding routable protocol and next-hop path according to the determining result of the route determining module, and then forwards the message; at the same time, the first router submits the determining result obtained in step 2) and a related estimated value to the forwarding module, which updates the corresponding resource state in the current routing table and rules according to the resource occupying condition during the forwarding process; and step 4) the second router, after receiving the network layer message sent by the first router, un-packages the message, extracts and processes the information from the interaction data through the route determining module in itself, including extracting characteristic performance targets and updating the performance requirements with the extracted characteristic performance targets after the last-hop forwarding procedure; if the characteristic performance targets are realized, then the routing process ends; or else, step 2) is re-executed.

In the above technical solution, step 2) comprises the following steps:

step 2-1) the route determining module requests the routing related information about the M routable protocols maintained currently by the forwarding module, and then the forwarding module returns information including the resource condition of the possible next-hop path correspondingly maintained by each routable path, network state information and a routing table to the route determining module;

step 2-2) the route determining module, based on the data obtained in step 2-1) and step 1), selects the optimal routable protocol and path under the condition of meeting the characteristic performance targets of the applications; and step 2-3) the route determining module, based on the determining result, estimates the new resource occupying condition of the selected candidate routing path under the current network environment.

The advantages of the present invention lie in that:

By integrating various characteristics and states of applications as well as different routable protocols, the present invention realizes real-time protocol selection and dynamic routing. Moreover, the present invention is easy to be expanded to other protocols, thus being adaptive to the continuous development and evolution of network services.

DETAILED DESCRIPTION OF THE EMBODIMENTS

The present invention is further described in conjunction with accompanying drawings.

Figure 1:
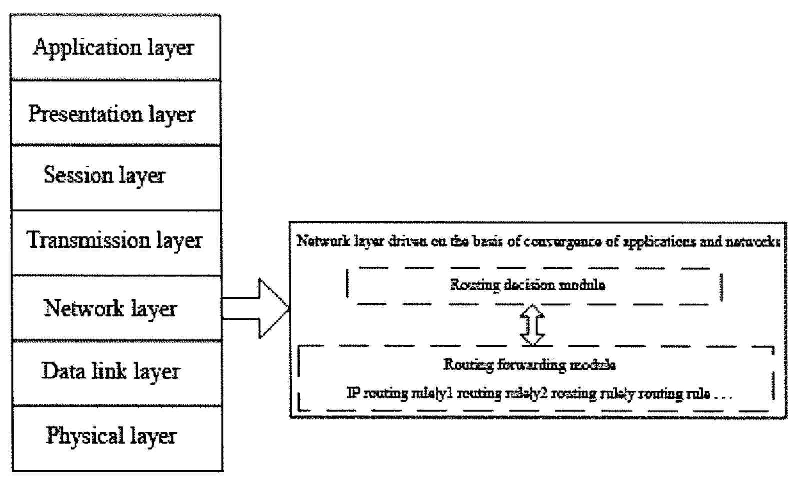
FIG. 1 is a schematic diagram of the multi-protocol routing system of the present invention.

Referring to FIG. 1, the multi-protocol routing system of the present invention comprises a route determining module and a forwarding module, both of which are located on the network layer in an OSI (open system interconnection) seven-layer network system, wherein the route determining module is used for determining the type of routable protocol and the next-hop path to be selected for the current routing phase based on the related information of applications and networks; and the forwarding module, including different routable protocols and corresponding routing information, is used for periodically calculating the newest remaining network resources and link state during a routing process, and updating the current route table with the resulted newest remaining network resources and link state. Both of the route determining module and the forwarding module are in the routers.

The modules in the system are further described below.

The route determining module makes decision based on the related information of applications and networks. The information related to the applications includes the information about the features and the state of the applications, and specifically includes one of the content information, the requirements information, the related QoS (Quality of Service) information of other applications, operation state and other related state information, or the combination of two or more of the aforementioned information; the information related to the networks includes the information about the features and state of the networks, and specifically includes one of the position information, link state information, the information of related networks, or the combination of two or more of the aforementioned information. The related information of the applications and the networks can be obtained from: 1) the information included in data messages; 2) information learnt from historical information; and 3) the information provided by routing tables corresponding to different routable protocols or related routing rule calculation methods. The above related information of the applications and the networks is extracted by the route determining module.

The route determining module has various functions, including: (1) requesting from the forwarding module routing related information of all routable protocols maintained currently, so as to obtain all the currently possible candidate paths as well as the network states and resource occupying information corresponding to the candidate paths. For example, supposing the number of currently maintained routable protocols is M and the $m^{th}$ routable protocol corresponds to a number of $\{N_m\}$ candidate paths, then the set of all the candidate paths is $HN_q=\{N_1 \cup N_2 \cup \ldots \cup N_M\}$, wherein $HNI_q$ is the set of the network states and resource occupying information corresponding to all the candidate paths; (2) extracting the characteristic information of the applications and the characteristic performance target information of the applications according to data messages or interaction data; (3) selecting, based on the information obtained previously, an optimal route. Alternatively, the optimal route can be selected by calculating a decision function. As an example, the decision function is represented by the following formula: $y=F(A_q, O_q, HN_q, HNI_q)$, wherein $A_q$ is the feature vector of an application, $O_q$ is a set of the characteristic performance targets, $HN_q$ is the set of all the candidate paths, $HNI_q$ is the set of the network states and the resource occupying condition corresponding to the candidate paths, y is the next-hop routable protocol and path obtained from the decision process, the purpose of the decision function F(A, O, HN, HNI) is to select, with A as the input, the optimal routable protocol and path under the condition of meeting the characteristic performance targets O of the applications, which is a multi-target optimization problem. The specific form of the decision function can be defined according to different applications, network characteristics and requirements. In addition, once the decision has been made, the route determining module further estimates, based on the decision result, the new resource occupying condition of the related candidate routing paths after data forwarding under the current network environment.

Figure 2:
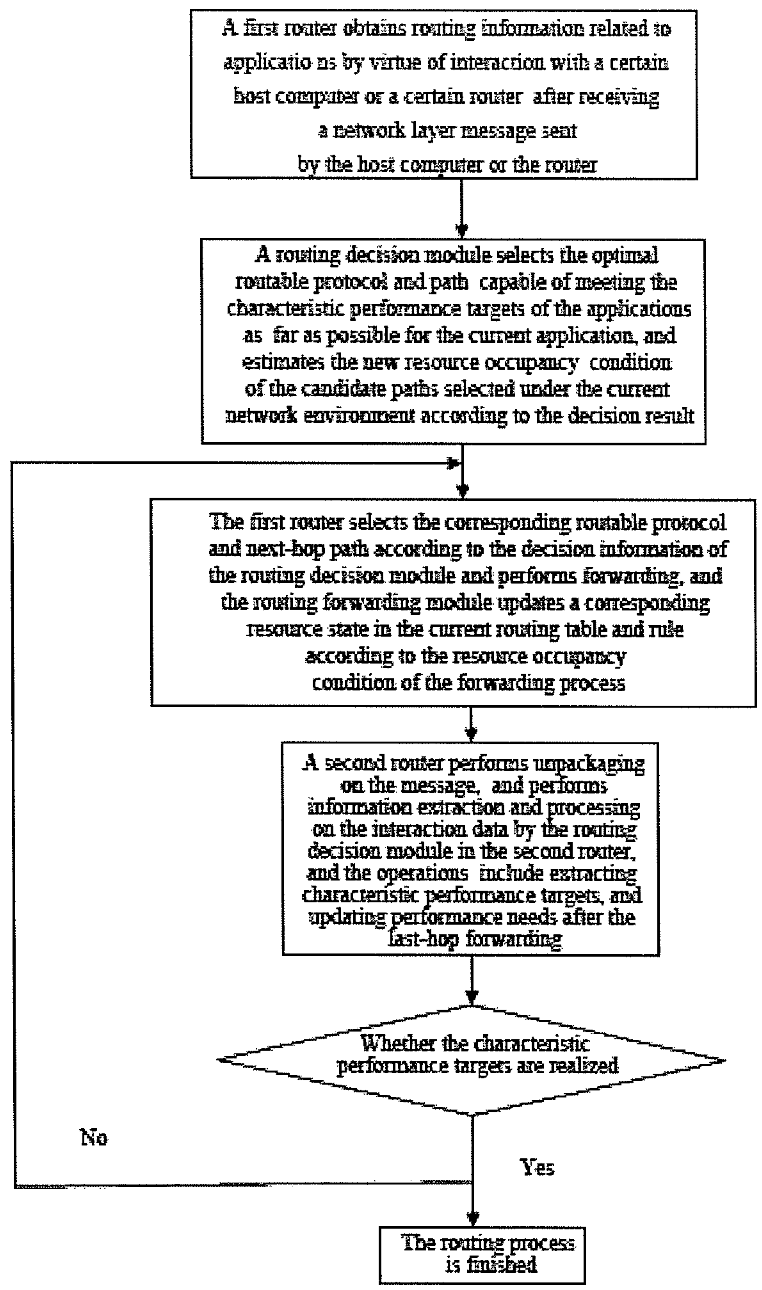
FIG. 2 is a schematic diagram of the multi-protocol routing method of the present invention.

The method realized by the multi-protocol routing system of the present invention is illustrated below with reference to FIG. 2.

Step 1) a first router obtains the routing information related to applications through interaction with a host computer or another router after receiving a network layer message from the host computer or the later router. The obtained routing information includes: a set of feature vectors of the application and network $A_q=\{a_{q1}, a_{q2}, \ldots, a_{qn}\}$ and a set of characteristic performance targets $O_q=\{o_{q1}, o_{q2}, o_{q3} \ldots\}$, wherein the set of feature vectors of the application and network includes the characteristic values extracted according to the characteristics and states of the applications and the networks; and the set of characteristic performance targets includes the combination of two or more information related to the characteristics and states of the applications and the networks. For example, a characteristic performance target is "the total time delay is 1 second", and the feature vector of application and network corresponding to the characteristic performance target is "the time delay of a hop is 0.05 milliseconds", and the like.

step 2) the route determining module in the first router selects the optimal routable protocol and path capable of meeting the characteristic performance targets of the current application according to the information obtained in step 1), the candidate paths obtained from the forwarding module, the network states and resource occupying condition information corresponding to the candidate paths; and the route determining module further estimates the new resource occupying condition of the candidate paths selected under the current network environment according to the decision result;

step 3) the first router selects the corresponding routable protocol and next-hop path according to the decision information of the route determining module, and then forwards the message; at the same time, the first router submits the decision information obtained in step 2) and a related estimated value to the forwarding module, which updates the corresponding resource state in the current routing table and rule according to the resource occupying condition during the forwarding process; and step 4) the second router, after receiving the network layer message sent by the first router, un-packages the message, extracts (including extracting characteristic performance targets) and processes the information from the interaction data through the route determining module in itself, and updates the performance requirements after the last-hop forwarding procedure; if the characteristic performance targets are realized, then the routing process ends; or else, step 2) is re-executed.

In the above technical solution, step 2) comprises the following steps:

step 2-1) the route determining module requests the routing related information about the M routable protocols maintained currently by the forwarding module, and then the forwarding module returns information including the resource condition of the possible next-hop path correspondingly maintained by each routable path, network state information and a routing table to the route determining module;

step 2-2) the route determining module, based on the data obtained in step 2-1) and step 1), makes a decision of the optimal route. The decision can be realized by a decision function, which is represented by the following formula y=F(Aq, Oq, HNq, HNIq), wherein Aq is the feature vector of an application, Oq is a set of the characteristic performance targets, HNq is the set of all the candidate paths, HNIq is the set of the network states and the resource occupying condition corresponding to the candidate paths, y is the next-hop routable protocol and path obtained from the decision process, the purpose of the decision function F(A, O, FIN, HNI) is to select, with A as the input, the optimal routable protocol and path under the condition of meeting the characteristic performance targets O of the applications.

step 2-3) the route determining module, based on the decision result, estimates the new resource occupying condition of the selected candidate routing path under the current network environment.

It should be noted finally that, the embodiments aforementioned are merely used for illustrating the technical solution of the present invention, rather than limiting the present invention. Although the present invention is illustrated in detail with reference to the embodiments, those of ordinary skill in the art should understand that any modifications or equivalent replacements on the technical solution of the present invention not departing from the sprit and scope of the technical solution of the present invention are encompassed in the scope of the claims of the present invention.

The invention claimed is:

1. A multi-protocol routing method realized on a multi-protocol routing system, comprising a route determining module and a forwarding module which are located in a network layer, wherein:

the route determining module is responsive to information related to applications and information related to networks for determining a type of routable protocol and a next-hop path which are to be selected in a current routing phase; and the forwarding module having different routable protocols and corresponding routing information, the forwarding module periodically calculating the newest remaining network resources and a state of link during a routing process and updating a forwarding table to a current state;

the method comprises steps of:

(1) obtaining, by a first router, routing information related to applications through interaction with a host computer or another router after receiving a network layer message from the host computer or the other router;

(2) selecting, by the route determining module in the first router, an optimal routable protocol and path capable of meeting characteristic performance targets of a current application according to the routing information obtained in the step (1), candidate paths obtained from the forwarding module, network states and resource occupying condition information corresponding to the candidate paths; and the route determining module further estimating a new resource occupying condition of the candidate paths selected under a current network environment according to a decision result;

the step (2) further comprises steps of:

(2.1) requesting, by the route determining module, the routing related information about M routable protocols maintained currently by the forwarding module, and, returning by the forwarding module, information including the resource condition of the possible next-hop path correspondingly maintained by each routable path, network state information and a routing table to the route determining module;

(2.2) the route determining module, based on the data obtained in the step (2.1) and the step (1), selecting, by the route determining module, the optimal routable protocol and path under a condition of meeting the characteristic performance targets of the applications; and (2.3) based on the determining result, estimating, by the route determining module, the new resource occupying condition of the selected candidate routing path under the current network environment;

(3) selecting, by the first router, a corresponding routable protocol and next-hop path according to a determining result of the route determining module, and forwarding the message;

at a same time, submitting, by the first router, the determining result and a related estimated value to the forwarding module, which updates a corresponding resource state in the current routing table and rules according to the resource occupying condition during forwarding; and (4) after receiving the network layer message sent by the first router, a second router un-packages the message, extracts and processes information from interaction data through the route determining module in itself, including extracting characteristic performance targets and updating performance requirements with the extracted characteristic performance targets after a last-hop forwarding procedure; if the characteristic performance targets are realized, then the routing process ends; else, the step (2) is re-executed.

2. The multi-protocol routing method according to claim 1, wherein the information related to the applications includes information about features and state of the applications, and specifically includes one of content information, requirements information, QoS (Quality of Service) information of other applications, operation state and other related state information, or any combination of two or more of the aforementioned information; the information related to networks includes information about features and state of networks, and includes at least one of position information, link state information, and information of related networks, or any combination of two or more of the aforementioned information.

3. The multi-protocol routing method according to claim 1, wherein: the route determining module:

requests routing-related information of all the routable protocols maintained currently from the forwarding module, to obtain all currently possible candidate paths as well as network states information and resource occupying information corresponding to the candidate paths;

extracts, according to data messages or interaction data, characteristic information of the applications and characteristic performance target information of the applications;

determines a route; and estimates, according to the determined route, a new resource occupying condition of related candidate routing paths after a message is forwarded under the current network environment.

4. The multi-protocol routing method according to claim 3, wherein determining the route includes calculating a decision function.

* * * * *